(12) United States Patent
Kwon et al.

(10) Patent No.: US 11,796,207 B2
(45) Date of Patent: Oct. 24, 2023

(54) HEATING CONTROL SYSTEM THROUGH PREDICTION OF USER'S SLEEP TIME BASED ON BIG DATA ANALYSIS USING SMARTPHONE

(71) Applicant: Korea Electronics Technology Institute, Seongnam-si (KR)

(72) Inventors: Kiwoong Kwon, Seoul (KR); Sanghun Kim, Suwon-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 64 days.

(21) Appl. No.: 17/558,730

(22) Filed: Dec. 22, 2021

(65) Prior Publication Data

US 2022/0205670 A1    Jun. 30, 2022

(30) Foreign Application Priority Data

Dec. 24, 2020    (KR) ........................ 10-2020-0183048

(51) Int. Cl.
| | | |
|---|---|---|
| *F24F 11/67* | (2018.01) | |
| *G06F 18/23* | (2023.01) | |
| *F24F 110/10* | (2018.01) | |
| *F24F 130/30* | (2018.01) | |
| *F24F 130/40* | (2018.01) | |

(52) U.S. Cl.
CPC .............. *F24F 11/67* (2018.01); *G06F 18/23* (2023.01); *F24F 2110/10* (2018.01); *F24F 2130/30* (2018.01); *F24F 2130/40* (2018.01)

(58) Field of Classification Search
CPC ...................................................... F24F 11/67
See application file for complete search history.

(56) References Cited

U.S. PATENT DOCUMENTS

| | | | | |
|---|---|---|---|---|
| 2016/0334124 A1* | 11/2016 | Hou | ..................... | A61B 5/4812 |
| 2018/0073760 A1* | 3/2018 | Smith | ....................... | F24F 11/30 |
| 2018/0080673 A1* | 3/2018 | Yamaji | ................... | G08C 17/02 |
| 2019/0182329 A1* | 6/2019 | Moss | ..................... | G06N 20/00 |
| 2020/0205726 A1* | 7/2020 | Lee | ......................... | G01S 7/415 |
| 2022/0401689 A1* | 12/2022 | Campanella | .......... | A61M 21/00 |

FOREIGN PATENT DOCUMENTS

KR    10-2014-004391 A    1/2014

* cited by examiner

*Primary Examiner* — Nathan L Laughlin
(74) *Attorney, Agent, or Firm* — NSIP Law

(57) ABSTRACT

The present invention relates a heating control system through prediction of user's sleep time based on a big data analysis using a smartphone, comprising a user terminal including a plurality of sensors that generate all kinds of sensor data; a big data server that stores all kinds of sensor data; a sleep prediction unit that calculates sleep prediction time of a user based on all kinds of sensor data; and a heating apparatus that determines whether the user currently sleeps or not based on the calculated sleep prediction time and changes an indoor heating control method according to whether the user sleeps or not.

14 Claims, 3 Drawing Sheets

[FIG. 1]
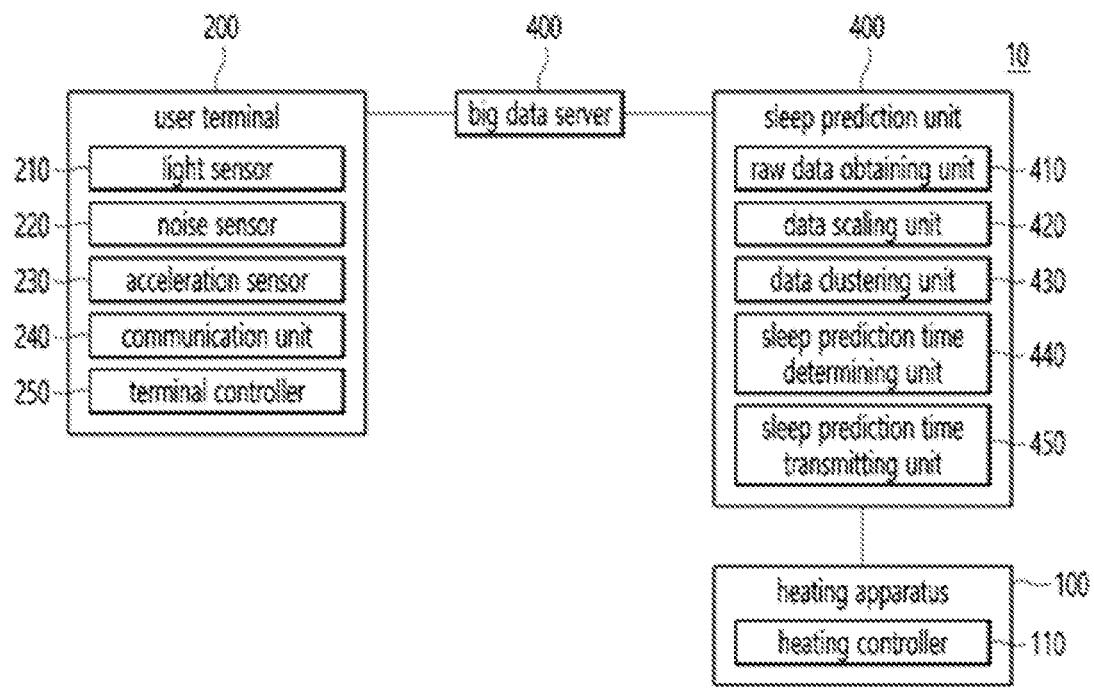
[FIG. 2]
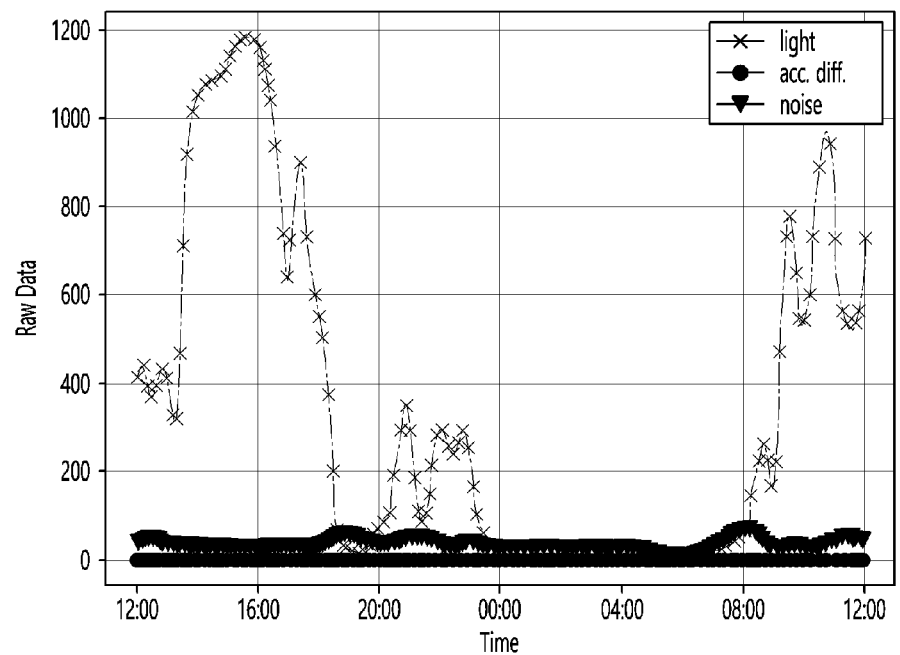

[FIG. 3]
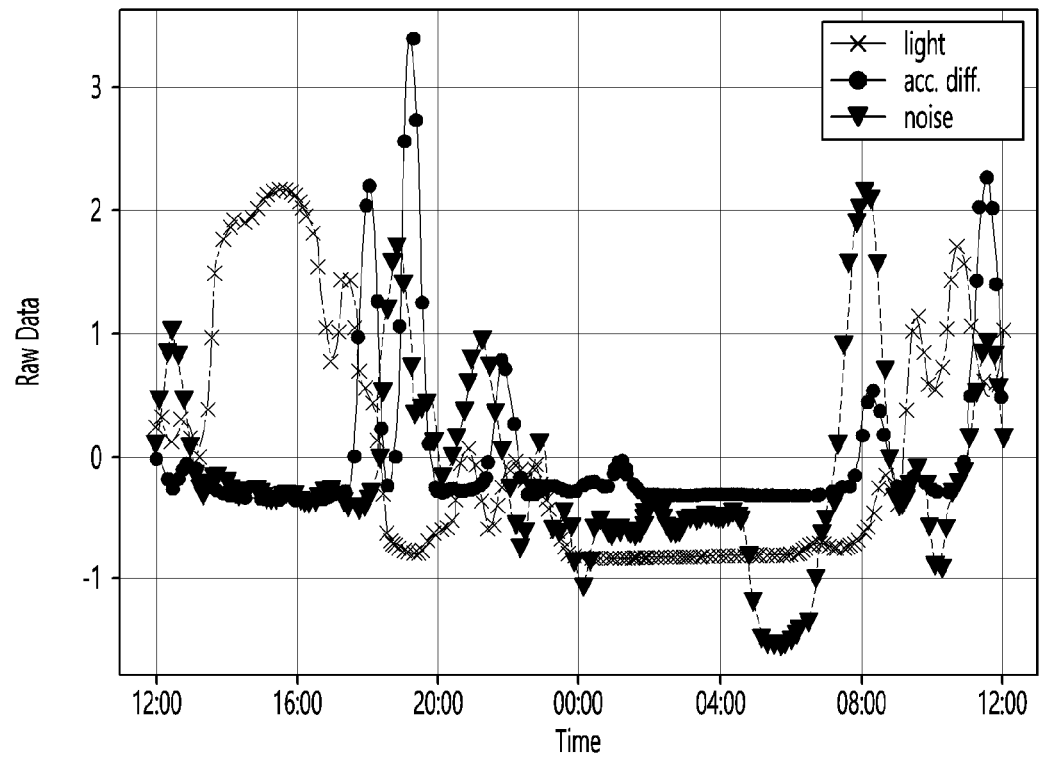
[FIG. 4]
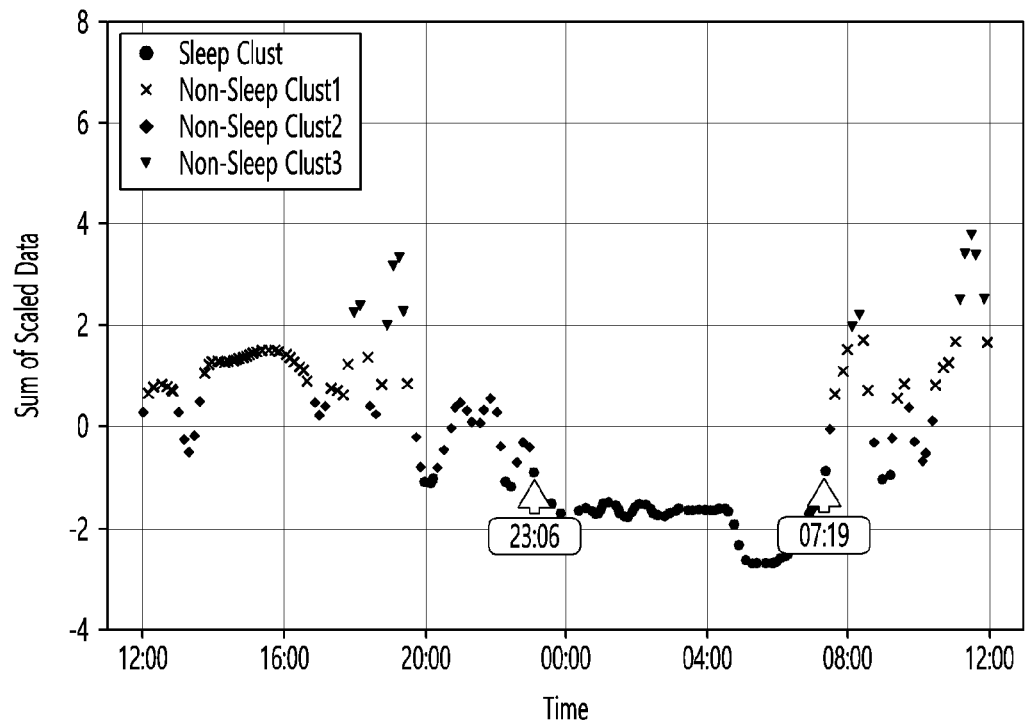

[FIG. 5]
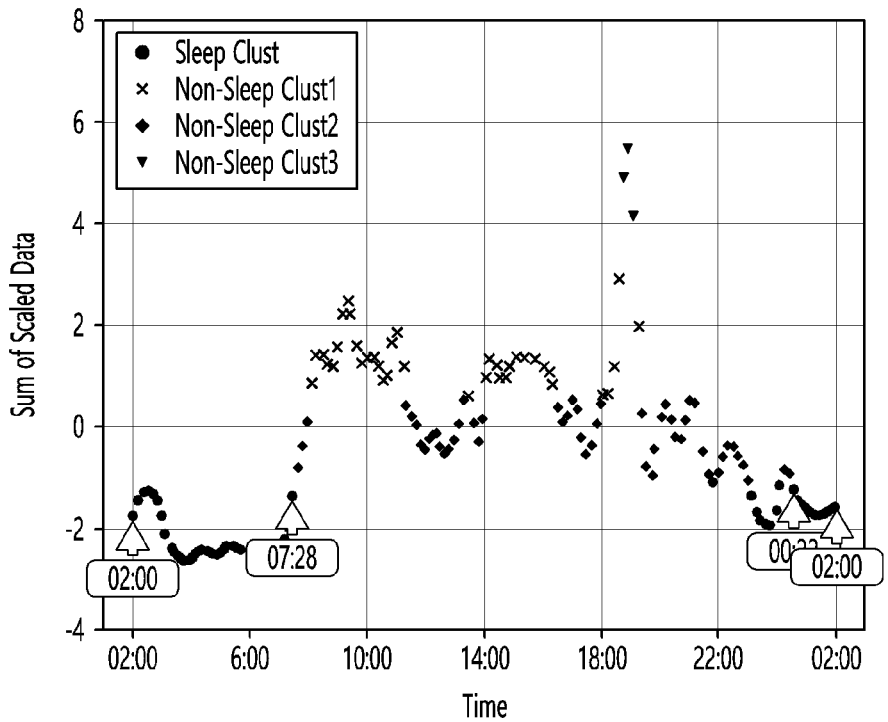
[FIG. 6]
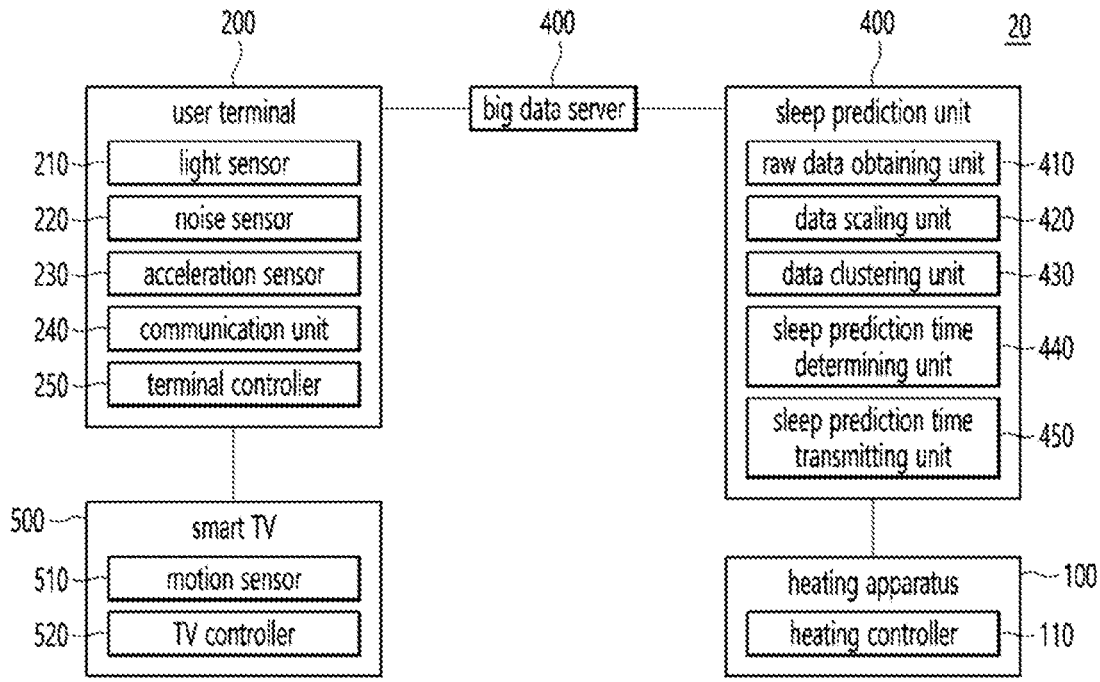

HEATING CONTROL SYSTEM THROUGH PREDICTION OF USER'S SLEEP TIME BASED ON BIG DATA ANALYSIS USING SMARTPHONE

CROSS-REFERENCE TO RELATED APPLICATIONS

This application claims the priority of Korean Patent Application No. 10-2020-0183048 filed on Dec. 24, 2020, in the Korean Intellectual Property Office, the disclosure of which is incorporated herein by reference.

BACKGROUND OF THE INVENTION

Field of the Invention

The present invention relates to a heating control system, and more particularly, to a heating control system that can reduce energy required for heating.

Description of the Related Art

In general, indoor heating control systems control heating through controlling indoor temperatures according to temperatures set by a user. However, since the indoor heating control systems are manually controlled by a user, energy may be consumed unnecessarily.

Recently, there has emerged an artificial intelligence-based heating control technology that saves energy by automatically reducing the temperature or controlling a heater based on an outside temperature so as to reduce energy, or by controlling the heater by determining a user's presence.

In this regard, Korean Laid-open Patent Publication No. 10-2014-0004301 discloses an automatic control type temperature control apparatus that can efficiently perform energy reduction. The Patent Document suggests controlling the degree of heating or cooling under conditions different from a condition when the user is absent or present, by determining the user's presence.

Meanwhile, while the user placed indoors sensitively reacts to changes in the indoor temperature when s/he is in a non-sleep state during heating, the user cannot sensitively react to the changes in the indoor temperature in a sleep state. Therefore, it is necessary to control the heating by dividing the user's state into a sleep mode and a non-sleep mode for saving energy.

However, conventional heating control systems have not suggested the technique of controlling heating by determining whether the user is in a sleep state and a non-sleep state.

SUMMARY OF THE INVENTION

In order to solve the problem in the related art, an object of the present invention is to provide a heating control system and a heating control method that would differently control heating methods based on whether a user is in a sleep state, controlling an indoor temperature, by determining whether the user sleeps or not, using a smartphone possessed by the user without a separate sleep determining device.

In order to achieve the object, a heating control system through prediction of user's sleep time based on a big data analysis using a smartphone includes: a sleep prediction unit that calculates user's sleep prediction time based on all kinds of sensor data generated by a plurality of sensors of a user terminal and stored in a big data server; and a heating controller that determines whether the user currently sleeps or not based on the calculated sleep prediction time, and changes an indoor heating control method according to whether the user currently sleeps or not.

Further, according to an embodiment, the sensor data includes light data generated by a light sensor included in the user terminal, noise data generated by a noise sensor included in the user terminal, and acceleration data generated by an acceleration sensor included in the user terminal.

Further, according to an embodiment, the sleep prediction unit includes: a raw data-obtaining unit that obtains sensor data including light data, noise data, and acceleration data during a certain period of time pre-set from the big data server; a data scaling unit that generates scaled data, respectively, by normalizing each of the light data, noise data and acceleration data obtained by the raw data obtaining unit; a data clustering unit that generates sum data for each unit time by summing up all sensor data scaled by the data scaling unit for each unit time and clusters the sum data for each unit time to a plurality of clusters based on a value of the sum data for each unit time; and a sleep prediction time determining unit that determines a cluster having a low average value of the sum data among the plurality of clusters as a sleep cluster and then calculates a time interval maintained for a certain period of time and comprised of a start time and an end time as a sleep prediction time.

Further, according to an embodiment, the sensor data obtained by the raw data obtaining unit includes light data, noise data and acceleration data at least for the past 24 hours based on the current time.

Further, according to an embodiment, the heating controller controls an indoor temperature by periodically turning on/off the heating if the user is determined to be in a sleep state.

Further, according to an embodiment, the heating controller controls the indoor temperature while turning on the heating if the user is determined to be in a non-sleep state.

Further, according to an embodiment, the heating controller changes a ratio of an 'on' state and an 'off' state of the heating based on a difference between a temperature set by the user and a current temperature.

Further, according to an embodiment, all kinds of sensor data stored in the big data server are provided and stored from the user terminal, regardless of a locked state and an unlocked stated of the user terminal.

Further, according to an embodiment, the data scaling unit calibrates scaled sensor data by multiplying the respective scaled sensor data by different weights after normalizing and scaling the sensor data.

A heating control system through prediction of user's sleep time based on a big data analysis using a smartphone according to an embodiment of the present invention includes: a sleep prediction unit that calculates user's sleep prediction time based on all kinds of sensor data generated by a plurality of sensors of a user terminal and a motion sensor of a smart TV and stored in a big data server; and a heating controller that determines whether the user currently sleeps or not based on the calculated sleep prediction time and changes an indoor heating control method based on whether the user currently sleeps or not.

Further, according to an embodiment, the sensor data includes light data generated by a light sensor included in the user terminal, noise data generated by a noise sensor included in the user terminal, acceleration data generated by an acceleration sensor included in the user terminal and motion data generated by a motion sensor of the smart TV.

Further, according to an embodiment, the sleep prediction unit includes: a raw data obtaining unit that obtains sensor data including light data, noise data, acceleration data and motion data during a certain period of time pre-set by the big data server; a data scaling unit that generates scaled data, respectively, by normalizing each of the light data, the noise data, the acceleration data and the motion data obtained from the raw data obtaining unit; a data clustering unit that generates sum data for each unit time by summing up all sensor data scaled by the data scaling unit for each unit time and clusters the sum data for each unit time to a plurality of clusters based on a value of the sum data for each unit time; and a sleep prediction time determining unit that determines a cluster having a low average value of the sum data among the plurality of clusters as a sleep cluster and then calculates a time interval maintained for a certain period of time and comprised of a start time and an end time as a sleep prediction time.

Further, according to an embodiment, the sensor data obtained by the raw data obtaining unit includes light data, noise data, acceleration data and motion data during at least for the past 24 hours based on the current time.

Further, according to an embodiment, the heating controller controls the indoor temperature by periodically turning on/off the heating if the user is determined to be in the sleep state.

Further, according to an embodiment, the heating controller controls the indoor temperature while turning on the heating if the user is determined to be in the non-sleep state.

Further, according to an embodiment, the heating controller changes a ratio of the 'on' and 'off' states of the heating based on a difference between a temperature set by the user and a current temperature.

Further, according to an embodiment, all kinds of sensor data stored in the big data server are provided and stored from the user terminal, regardless of a locked state and an unlocked stated of the user terminal.

The data scaling unit calibrates scaled sensor data by multiplying the respective scaled sensor data by different weights after normalizing and scaling the sensor data.

Advantageous Effects

According to the present invention, energy consumption can be reduced efficiently by predicting user' sleep time based on all kinds of sensor data generated in the user terminal and controlling heating based on the predicted sleep time.

Furthermore, according to the present invention, since the user's sleep time is predicted using the sensor data of the user terminal of the user, without purchasing electronic equipment equipped with a separate sensor, no additional costs may be incurred for heating control to save energy because there is no need to purchase separate equipment for predicting the sleep time.

Moreover, according to the present invention, it is possible to more accurately calculate the user's sleep prediction time and save energy by supplementing the acceleration data of the user terminal 200 without additional costs needed for purchasing separate equipment. This is achieved by calculating the sleep prediction time using the motion data obtained through the motion sensor of the smart TV generally installed on the wall of an indoor space, as well as sensor data generated by the sensor included in the user terminal.

BRIEF DESCRIPTION OF THE DRAWINGS

The above and other aspects, features and other advantages of the present invention will be more clearly understood from the following detailed description taken in conjunction with the accompanying drawings, in which:

FIG. 1 is a view for explaining a heating control system through prediction of user's sleep time based on a big data analysis using a smartphone according to a first embodiment of the present invention;

FIG. 2 is a view for explaining sensor data obtained by a raw data obtaining unit;

FIG. 3 is a view for explaining sensor data scaled by a data scaling unit;

FIGS. 4 and 5 are views for explaining sensor data clustered by a clustering unit; and FIG. 6 is a view for explaining a heating control system through prediction of user's sleep time based on a big data analysis using a smartphone according to a second embodiment of the present invention.

DETAILED DESCRIPTION OF THE PREFERRED EMBODIMENT

The description of the present invention is provided only to illustrate the embodiments on structural or functional aspects, and thus the scope of the present invention should not be interpreted to be limited to the exemplary embodiments disclosed below. That is, the exemplary embodiment may be changed in various ways and have various forms, and thus the scope of the present invention should be understood to include equivalents that can realize the technical spirit of the present invention.

Moreover, the objects or effects disclosed in the present invention are not intended to be entirely or exclusively included in a specific embodiment, and thus the scope of the present invention should not be interpreted to be limited to the specific embodiment.

Moreover, the accompanying drawings, which are included to provide a further understanding of the invention, provide embodiments of the present invention together with detail explanation. However, a technical characteristic of the present invention is not limited to a specific drawing, and characteristics disclosed in each of the drawings are combined with each other to configure a new embodiment.

A heating automatic control system described in the following embodiments will be described in more detail with reference to each of the drawings.

FIG. 1 is a view for explaining a heating control system through prediction of a user's sleep time based on a big data analysis using a smartphone according to one embodiment of the present invention.

With reference to FIG. 1, a heating control system 10 includes a heating apparatus 100, a user terminal 200, a big data server 300 and a sleep prediction unit 400.

The heating apparatus 100 controls an indoor temperature in a building, a room and the like, and includes a heating controller 100 for controlling the indoor temperature.

The heating controller 100 controls the indoor temperature to a temperature designated by the user or to a predetermined temperature. In this case, the heating controller 110 determines whether the user sleeps or not based on the user's sleep prediction time provided by the sleep prediction unit 400, and performs heating using different heating methods based on the user sleeps or not. The heating controller 110 will be described in detail below.

The user terminal 200 of the present invention is provided as a smartphone possessed by the user and equipped with all kinds of sensors. Meanwhile, the user terminal 200 may be provided along with a tablet and pad equipped with various sensors, in addition to the smartphone. The user terminal 200 transmits all kinds of sensor data collected using a variety of sensors to the big data server 300.

The user terminal 200 includes a light sensor 210, a noise sensor 220, an acceleration sensor 230, a communication unit 240 and a terminal controller 250.

The light sensor 210 generates light data by measuring light in a location where the user terminal 200 is placed. The light data is provided to the big data server 300 through the communication unit 240.

The noise sensor 220 generates noise data by measuring noises in a location where the user terminal 200 is placed. The noise data includes at least one of a user voice, a voice measured by electronic equipment, or an external noise. The noise data is provided to the big data through the communication unit 240.

The acceleration sensor 230 generates acceleration data by reading three-directional motions of the user terminal 200. The acceleration data is provided to the big data server 300 through the communication unit 240.

The communication unit 240 is connected via communication to the Big Data server 300 and transmits or receives information. Specifically, the communication unit 240 transmits all kinds of sensor data to the big data server 300.

At this time, all kinds of sensor data basically include light data generated by the light sensor 210, noise data generated by the noise sensor 220, and acceleration data generated by the acceleration sensor 230. In addition, the sensor data may further include other sensor data generated by a sensor included in the user terminal 200.

The terminal controller 250 may be a specific application installed in the user terminal 200 and configured for heating control. The terminal controller 250 controls the user terminal 200 so that the sensor data including light data, noise data and acceleration data can be transmitted to the big data server 300.

At this time, the terminal controller 250 controls the user terminal 200 so that the sensor data including light data, noise data and acceleration data for determining the user's sleep prediction time can be provided to the big data server 300, when the heating apparatus 100 is turned on, regardless of a locked state and an unlocked stated of the user terminal.

Meanwhile, an electronic wristband to recognize patient states such as sleep states is suitable only for patients with no activity and is very inconvenient for normal people to wear indoors at all times. Since the present invention uses the smartphone possessed by the user, there is no need to purchase separate electronic equipment; furthermore, since the user does not need to wear the electronic equipment at all time on the body, the user will feel more comfortable.

The big data server 300 stores the sensor data provided from the user terminal 200 in time series and provides the stored sensor data to the sleep prediction unit 400. The big data server 300 may be placed in the indoor space and may be provided as an external storage device such as a server, cloud, or the like.

The sleep prediction unit 400 receives the sensor data including the light data, the noise data and the acceleration data from the big data server 300, and learns the sensor data to calculate the sleep prediction time of the user.

Specifically, the sleep prediction unit 400 includes a raw data obtaining unit 410, a data scaling unit 420, a data clustering unit 430, a sleep prediction time determining unit 440 and a sleep prediction time transmitting unit 450.

The raw data obtaining unit 410 obtains the light data, the noise data and the acceleration data during a certain period of time pre-set by the big data server 200. Preferably, the raw data obtaining unit 410 obtains the sensor data including the light data, the noise data and the acceleration data during at least for the past 24 hours based on the current time.

Light data are the data generated by measuring ambient brightness by the light sensor installed in the smart phone. Since most users darken the surroundings before going to sleep, it may be determined that, as the light decreases, the user may be more likely to go to sleep.

Acceleration data are the data generated by measuring the motion using a three-directional acceleration sensor installed on the smartphone. If the acceleration measured during a certain period of time remains unchanged, it may be determined that the user is more likely to be asleep.

Noise data is generated using a mike included in the smart phone. When there is a loud sound, it may be determined that the user is more likely not to sleep.

Meanwhile, it is more accurate to determine the user's sleep mode by combining light data, acceleration data and noise data, rather than to do so based on any type of the data mentioned above according to the user's tendency. Hence, the present invention controls the heating apparatus 100 by determining whether the user sleeps or not based on all of the light data, the acceleration data and the noise data generated from the user terminal.

FIG. 2 is a view for explaining sensor data obtained by a raw data obtaining unit.

With reference to FIG. 2, it is illustrated that the amount of change in light sensor information (light) is larger than the amounts of changes in acceleration sensor information (acc) and noise sensor information (noise). The unit of acceleration data is m/s2, the unit of light data is 1×, and the unit of noise data is dB. Since each unit of the sensor data is different, the sensor data need to be processed to determine whether the user sleeps or not based on the three types of sensor data.

FIG. 3 is a view for explaining sensor data scaled by a data scaling unit.

With reference to FIG. 3, the data scaling unit 420 scales each sensor data obtained from the raw data obtaining unit 410 and generates the scaled sensor data.

Specifically, the data scaling unit 420 generates the scaled sensor data by normalizing the sensor data obtained from the raw data obtaining unit 410. Meanwhile, the data scaling unit 420 may scale sensor information by normalizing the sensor data in a variety of methods.

FIG. 3 show the sensor data scaled using the standard scaler through which each of the sensor data is normalized as $\mu=0$, $\sigma=1$ by the data scaling unit 420.

Of note, while FIG. 2 shows a pre-scaling state where the amount of change in light sensor is larger than the amounts of changes in the acceleration sensor and noise sensor, FIG. 3 shows a post-scaling state that clearly reveals the amounts of changes in the acceleration sensor and noise sensor as well as the amount of change in light sensor Meanwhile, after the data scaling unit 420 normalizes and scales the sensor data obtained by the raw data obtaining unit 410, the data scaling unit 420 may calibrate the scaled sensor data by multiplying the respective scaled sensor data by different weights All three types of data (light data, acceleration data the noise data) may have different influences in determining the user's sleep state. For example, if there is no substantial change in the acceleration data, the user is highly likely to hold the user terminal. In this case, the user is highly likely not to be asleep. Thus, the scaled sensor data may be calibrated by setting the weight of the acceleration data to be greater than the weights of other light data and noise data.

FIGS. 4 and 5 are views for explaining sensor data clustered by a clustering unit. The clustering unit 430 sums up all sensor data scaled by the data scaling unit 420 for each unit time and generates a plurality of clusters based on the summed data, i.e., clusters into a plurality of groups.

The data clustering unit 430 sums up the scaled sensor data values for each unit time. For example, as shown in FIG. 3, when a scaled light data value at 16:00 is 2.2, a scaled acceleration data value is −0.3; and furthermore, when a scaled noise data value is −0.3, a value of the sum data is 1.6 at 16:00, as shown in FIG. 4.

Clustered data are generated using the number of pre-set groups (k) for the summed sensor data. For example, the clustering unit 430 generates the clustered data using a k-means algorithm that is k (the number of groups)=4. At this time, since the number of groups k is 4, the number of clusters becomes 4, and different clusters are indicated by different colors.

The sleep prediction time determining unit 440 selects a cluster with a lowest average value of the sum data as a sleep cluster, and determines a time interval maintained for a certain period of time and comprised of a start time and an end time as a sleep prediction time.

For example, in FIG. 4, data of different clusters are indicated using different colors and marks. The time prediction time determining unit 440 selects a blue cluster with a lowest average value of the sum data among the clusters as a sleep cluster.

Moreover, the time prediction time determining unit 440 determines a data interval continued during a predetermined time among the sleep clusters as a sleep prediction time. For instance, if the predetermined time is 5 hours, the sleep prediction time determining unit 440 determines 23:06 to 07:19 which is a time interval continued for at least 5 hours among the blue clusters, as the user's sleep prediction time. At this time, the sleep clusters located around 20:00 and 09:00 among the blue sleep clusters are excluded from the sleep prediction time because the continued time is less than the predetermined time.

Meanwhile, as shown in FIG. 5, assuming that it is now 2 a.m. and it is measured whether or not the user sleeps at 2 a.m., first, the sleep prediction time is calculated using the aforementioned method based on the data for 24 hours from 2 a.m. the other day. Since the present time, 2 a.m., is included within the sleep prediction time, it may be determined that the user is currently sleeping.

The sleep prediction time transmitting unit 450 transmits the determined sleep prediction time to the heating controller 110 of the heating apparatus 100.

The heating controller 110 of the heating apparatus 100 determines whether the user is currently sleeping or not based on the sleep prediction time and changes a heating method according to the determined result.

In other words, if the user is determined to be currently asleep, the heating apparatus 100 controls the indoor temperature by periodically turning on and/off the heating. However, when the user is determined not to sleep, the heating apparatus 100 controls the indoor temperature while maintaining the heating in the 'on' state.

Specifically, the heating control 110 determines that the user is currently sleeping and dynamically sets a timer of the heating apparatus 100 according to the difference between a set temperature and the current temperature, when the heating is turned on. If the timer is set to n, when the heating apparatus 100 is turned on for the first n minutes and repeatedly turned on or off during the remaining 60 to n minutes; n is set according to Equation (1) that takes into account the difference between the set temperature and the current temperature.

$$n = \begin{cases} \text{diff} * 15 & \text{if } \text{diff} < 4 \\ 60 & \text{otherwise} \end{cases} \quad \text{[Equation 1]}$$

where n is a time of turning on the heating apparatus 100 among times set via the timer, and diff is a difference between a set temperature as the target temperature set by the user and the current temperature. That is, the ratio of the 'on' state and the 'off' state of the heating is changed based on the difference between the temperature set by the user and the current temperature. Specifically, with a decrease of the difference between the current temperature and the set temperature, the energy is saved by reducing the time ratio of the 'on' state of the heating apparatus 100 under control of the timer. Furthermore, with an increase of the difference between the current temperature and the set temperature, the user is prevented from waking up due by cold by increasing the time ratio of the 'on' state of turning on the heating apparatus 100 under control of the timer.

If the difference between the current temperature and the set temperature is equal to or larger than a predetermined size, the cold indoor temperature is increased by continuously turning on the heating without performing timer control. For instance, when the difference between the current temperature and the set temperature is 4 or higher, the heating may be kept on continuously.

If one timer control routine is completed, the heating controller 110 calculates n again based on the difference between the set temperature and the current temperature, n increases or decreases every hour to lower energy consumption of the heating device 100 and to simultaneously maintain the user's comfort by preventing the user from waking up by the cold.

According to the present invention, the energy consumption can be efficiently reduced by predicting the user's sleep time based on the sensor data generated by the user terminal and controlling the heating based on the predicted sleep time.

According to the present invention, since the user's sleep time is predicted using the sensor data of the user terminal of the user, without purchasing electronic equipment equipped with a separate sensor, no additional cost may be incurred for heating control to save energy because there is no need to purchase separate equipment for predicting the sleep time.

FIG. 6 is a view for explaining a heating control system through prediction of user's sleep time based on a big data analysis using a smartphone according to a second embodiment of the present invention.

While the first embodiment represents that the sleep prediction time was calculated using the sensor data of the user terminal, the second embodiment represents that the sensor data of the smart TV as well as the sensor data of the user terminal is considered at the time of calculating the sleep prediction time. The redundant description relevant to the first embodiment will be omitted.

The heating control system 20 via the user's sleep time prediction based on the big data analysis using smartphone in the second embodiment includes the heating apparatus 100, the user terminal 200, and the big data server 300, the sleep prediction unit 400 and the smart TV 500.

The smart TV 500 is the TV that may be wirelessly connected to the user terminal 200 via Bluetooth, Wi-Fi, 3G, 4G, and 5G and may be controlled by the user terminal 200. The smart TV 500 includes a motion sensor for sensing a motion of the user in front of the smart TV 500, and a TV controller 520 that controls the smart TV.

The motion sensor 510 generates motion data by sensing the front motion, and the user terminal 200 receives the motion data. The TV controller 520 transmits the motion data generated by the motion sensor 520 to the user terminal 200. At this time, the controller 520 may be provided as a specific application installed in the smart TV.

If motion data are not transmitted to the user terminal 200, the terminal controller 250 may determine the user's motion in a state the smart TV is turned off. Conversely, if motion data are transmitted to the user terminal 200, the terminal controller 250 may determine that the smart TV is turned on. At this time, the motion data include both data in a motionless state and data in a movable state.

The user terminal 200 provides the big data server 300 with the sensor data including the light data, the noise data and the acceleration data, and the motion data collected using all kinds of sensors. The big server data 300 stores the sensor data including the light data, the noise data and the acceleration data, and the motion data in time series.

Conversely, the TV controller 520 may be wirelessly connected to the big data sever 300 via Bluetooth, Wi-Fi, 3G, 4G, and 5G and may transmit the motion data generated by the motion sensor 520 directly to the big data server 300.

The sleep prediction unit 400 calculates the sleep prediction time in consideration of the light data, the noise data, the acceleration data and the motion data. The sleep prediction unit 400 calculates the sleep prediction time by learning these data. The process of calculating the sleep prediction time proceeds in the same way that the sleep prediction unit processes in the first embodiment.

In general, in an independent space such as a room or a living room, the smart TV is installed on the wall or stands close to the wall. Hence, when the user performs different actions such as reading a book or watching a smart TV without touching the user terminal, the user terminal does not sense the user's motion; however, the smart TV may sense the user's movement.

Therefore, in the embodiments, the sleep prediction time is calculated using the motion data sensed by the motion sensor of the smart TV installed as a rule on the wall of the indoor space, as well as sensor data generated by the sensor installed in the user terminal, so that the user's sleep prediction time can be more accurately calculated by supplementing the acceleration data of the user terminal 200 without purchasing any separate equipment.

As described above, the invention has been shown and described with reference to preferred embodiments thereof, it will be understood by those skilled in the art that the exemplary embodiment may be changed in various ways and have various forms without departing from the spirit and scope of the invention as defined by the appended claims.

DESCRIPTION OF REFERENCE NUMERALS

10: heating control system
100: heating apparatus
210: light sensor
230: acceleration sensor
250: terminal controller
200: user terminal
220: noise sensor
240: communication unit
300: big data server 400: sleep prediction unit
420: data scaling unit
440: sleep prediction time determining unit
450: sleep prediction time transmitting unit
410: raw data obtaining unit
430: data clustering unit

What is claimed is:

1. A heating control system through prediction of user's sleep time based on a data analysis using a smartphone, comprising:
   a sleep prediction unit that calculates user's sleep prediction time based on a plurality of sensor data generated by a plurality of sensors of a user terminal and stored in a data server; and
   a heating controller that determines whether the user currently sleeps or not based on the calculated sleep prediction time and changes an indoor heating control method according to whether the user currently sleeps or not,
   wherein the sensor data comprises light data generated by a light sensor included in the user terminal, noise data generated by a noise sensor included in the user terminal, and acceleration data generated by an acceleration sensor included in the user terminal, and
   wherein the sleep prediction unit comprises:
   a raw data obtaining unit that obtains sensor data including light data, noise data and acceleration data during a certain period of time pre-set by the big data server;
   a data scaling unit that generates scaled data, respectively, by normalizing each of the sensor data scaled by the data scaling unit for each unit time and clusters the sum data for each unit time to a plurality of clusters based on a value of the sum data for each unit time; and
   a sleep prediction time determining unit that determines a cluster having a low average value of the sum data among the plurality of clusters as a sleep cluster and then calculates a time interval maintained for a certain period of time and comprised of a start time and an end time as the sleep prediction time.

2. The heating control system through prediction of user's sleep time based on a data analysis using a smartphone of claim 1, wherein the sensor data obtained by the raw data obtaining unit includes light data, noise data and acceleration data at least for the past 24 hours based on the current time.

3. The heating control system through prediction of user's sleep time based on a data analysis using a smartphone of claim 1, wherein the heating controller controls an indoor temperature by periodically turning on/off the heating if the user is determined to be in a sleep state.

4. The heating control system through prediction of user's sleep time based on a data analysis using a smartphone of claim 1, wherein the heating controller controls the indoor temperature while turning on the heating if the user is determined to be in a non-sleep state.

5. The heating control system through prediction of user's sleep time based on a data analysis using a smartphone of claim 1, wherein the heating controller changes a ratio of an 'on' state and an 'off' state of the heating based on a difference between a temperature set by the user and a current temperature.

6. The heating control system through prediction of user's sleep time based on a data analysis using a smartphone of claim 1, wherein all kinds of sensor data stored in the big data server is provided and stored from the user terminal, regardless of a locked state and an unlocked stated of the user terminal.

7. The heating control system through prediction of user's sleep time based on a data analysis using a smartphone of claim 1, wherein the data scaling unit calibrates scaled sensor data by multiplying the respective scaled sensor data by different weights after normalizing and scaling the sensor data.

8. A heating control system through prediction of user's sleep time based on a data analysis using a smartphone, comprising:
   a sleep prediction unit that calculates user's sleep prediction time based on a plurality of sensor data generated by a plurality of sensors of a user terminal and a motion sensor of a smart TV and stored in a data server; and
   a heating controller that determines whether the user currently sleeps or not based on the calculated sleep prediction time and changes an indoor heating control method based on whether the user currently sleeps or not,
   wherein the sensor data includes light data generated by a light sensor included in the user terminal, noise data generated by a noise sensor included in the user terminal, acceleration data generated by an acceleration sensor included in the user terminal and motion data generated by the motion sensor of the smart TV, and
   wherein the sleep prediction unit comprises:
   a raw data obtaining unit that obtains sensor data including light data, noise data, acceleration data and motion data during a certain period of time pre-set by the big data server;
   a data scaling unit that generates scaled data, respectively, by normalizing each of the light data, the noise data, the acceleration data and the motion data obtained by the raw data obtaining unit, respectively;
   a data clustering unit that generates sum data for each unit time by summing up all sensor data scaled by the data scaling unit for each unit time and clusters the sum data for each unit time to a plurality of clusters based on a value of the sum data for each unit time; and
   a sleep prediction time determining unit that determines a cluster having a low average value of the sum data among the plurality of clusters as a sleep cluster and calculates a time interval maintained for a certain period of time and comprised of a start time and an end time as a sleep prediction time.

9. The heating control system through prediction of user's sleep time based on a data analysis using a smartphone of claim 8, wherein the sensor data obtained by the raw data obtaining unit includes the light data, the noise data, the acceleration data and the motion data during at least for the past 24 hours based on the current time.

10. The heating control system trough prediction of user's sleep time based on a data analysis using a smartphone of claim 8, wherein the heating controller controls the indoor temperature by periodically turning on/off the heating if the user is determined to be in the sleep state.

11. The heating control system through prediction of user's sleep time based on a data analysis using a smartphone of claim 8, wherein the heating controller controls an indoor temperature while turning on the heating if the user is determined to be in the non-sleep state.

12. The heating control system through prediction of user's sleep time based on a data analysis using a smartphone of claim 8, wherein the heating controller changes a ratio of an 'on' state and an 'off' state of the heating based on a difference between a temperature set by the user and a current temperature.

13. The heating control system through prediction of user's sleep time based on a data analysis using a smartphone of claim 8, wherein all kinds of sensor data stored in the big data server is provided and stored from the user terminal, regardless of a locked state and an unlocked stated of the user terminal.

14. The heating control system through prediction of user's sleep time based on a data analysis using a smartphone of claim 8, wherein the data scaling unit calibrates scaled sensor data by multiplying the respective scaled sensor data by different weights after normalizing and scaling the sensor data.

\* \* \* \* \*